(12) United States Patent
Adderly et al.

(10) Patent No.: US 10,078,183 B2
(45) Date of Patent: Sep. 18, 2018

(54) WAVEGUIDE STRUCTURES USED IN PHONOTICS CHIP PACKAGING

(71) Applicant: GLOBALFOUNDRIES INC., Grand Cayman (KY)

(72) Inventors: Shawn A. Adderly, San Ramon, CA (US); Samantha D. DiStefano, Burlington, VT (US); Jeffrey P. Gambino, Portland, OR (US); Prakash Periasamy, Essex Junction, VT (US); Donald R. Letourneau, Winooski, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/966,781

(22) Filed: Dec. 11, 2015

(65) Prior Publication Data

US 2017/0168242 A1    Jun. 15, 2017

(51) Int. Cl.
| G02B 6/13 | (2006.01) |
| G02B 6/12 | (2006.01) |
| G02B 6/30 | (2006.01) |
| G02B 6/136 | (2006.01) |
| G02B 6/122 | (2006.01) |

(52) U.S. Cl.
CPC .............. *G02B 6/30* (2013.01); *G02B 6/122* (2013.01); *G02B 6/13* (2013.01); *G02B 6/136* (2013.01)

(58) Field of Classification Search
USPC ............ 385/55–88, 147; 257/664, E23.002, 257/E21.158; 438/613
See application file for complete search history.

(56) References Cited

U.S. PATENT DOCUMENTS

| 5,703,980 A * | 12/1997 | MacElwee | G02B 6/30 385/30 |
| 6,879,757 B1 * | 4/2005 | Zhou | G02B 6/30 385/14 |
| 6,967,347 B2 * | 11/2005 | Estes | B82Y 10/00 257/25 |
| 7,453,132 B1 * | 11/2008 | Gunn, III | H01L 31/0232 257/448 |

(Continued)

FOREIGN PATENT DOCUMENTS

WO    WO2014093616 A1    6/2014

OTHER PUBLICATIONS

Disclosed Anonymously, "FEOL oxide under waveguide for photonics chip", ip.com, IPCOM000237686, Jul. 2, 2014, 4 pages.

(Continued)

*Primary Examiner* — Akm Enayet Ullah
(74) *Attorney, Agent, or Firm* — Michael LeStrange; Andrew M. Calderon; Roberts Mlotkowski Safran Cole & Calderon, P.C.

(57) ABSTRACT

The disclosure relates to semiconductor structures and, more particularly, to waveguide structures used in phonotics chip packaging and methods of manufacture. The structure includes: a first die comprising photonics functions including a waveguide structure; a second die bonded to the first die and comprising CMOS logic functions; and an optical fiber optically coupled to the waveguide structure and positioned within a cavity formed in the second die.

20 Claims, 5 Drawing Sheets

(56) References Cited

U.S. PATENT DOCUMENTS

| | | | |
|---|---|---|---|
| 7,454,102 B2* | 11/2008 | Keyser | G02B 6/12 385/129 |
| 7,616,904 B1 | 11/2009 | Gunn, III et al. | |
| 7,738,753 B2* | 6/2010 | Assefa | B82Y 20/00 216/2 |
| 8,168,939 B2* | 5/2012 | Mack | H04B 10/503 250/225 |
| 8,280,207 B2* | 10/2012 | Pinguet | G02B 6/124 385/15 |
| 8,724,937 B2* | 5/2014 | Barwicz | G02B 6/30 385/14 |
| 8,772,902 B2 | 7/2014 | Assefa et al. | |
| 9,377,587 B2* | 6/2016 | Taylor | G02B 6/421 |
| 9,559,081 B1* | 1/2017 | Lai | H01L 25/0657 |
| 2003/0017647 A1* | 1/2003 | Kwon | H01L 21/568 438/109 |
| 2007/0080414 A1 | 4/2007 | Bjorkman et al. | |
| 2009/0263923 A1* | 10/2009 | Shimooka | G02B 6/4214 438/31 |
| 2009/0294814 A1* | 12/2009 | Assefa | H01L 25/167 257/292 |
| 2013/0142211 A1* | 6/2013 | Doany | G02B 6/4246 372/50.12 |
| 2013/0209026 A1* | 8/2013 | Doany | G02B 6/30 385/14 |
| 2013/0234305 A1* | 9/2013 | Lin | H01L 23/5222 257/664 |
| 2014/0217606 A1 | 8/2014 | Cho | |
| 2014/0219604 A1 | 8/2014 | Hackler, Sr. et al. | |
| 2015/0055911 A1 | 2/2015 | Bowers | |
| 2015/0072450 A1 | 3/2015 | El-Ghoroury et al. | |

OTHER PUBLICATIONS

Disclosed Anonymously, "Design of Photonic Waveguide Gratings for Near-Normal Input/Output Coupling in Standard CMOS using Polysilicon Gate Material", ip.com, IPCOM000211814, Oct. 19, 2011, 4 pages.

R. Baets, "Silicon photonics: integrating a Tb/s optical interconnect layer into CMOS-systems". Photonics Research Group, University of Ghent-IMEC, Center for Nano- and Biophotonics, 45 pages.

N. Sherwood-Droz et al, "Scalable 3D dense integration of photonics on bulk silicon", Optics Express, vol. 19, No. 18, Aug. 25, 2011, 8 pages.

Zuffada, "Vision on Silicon Photonics for Efficient Data Communications" STMicroelectronics, Photonics 21-WG6 Workshop, Brussels, Apr. 30, 2013, 27 pages.

* cited by examiner

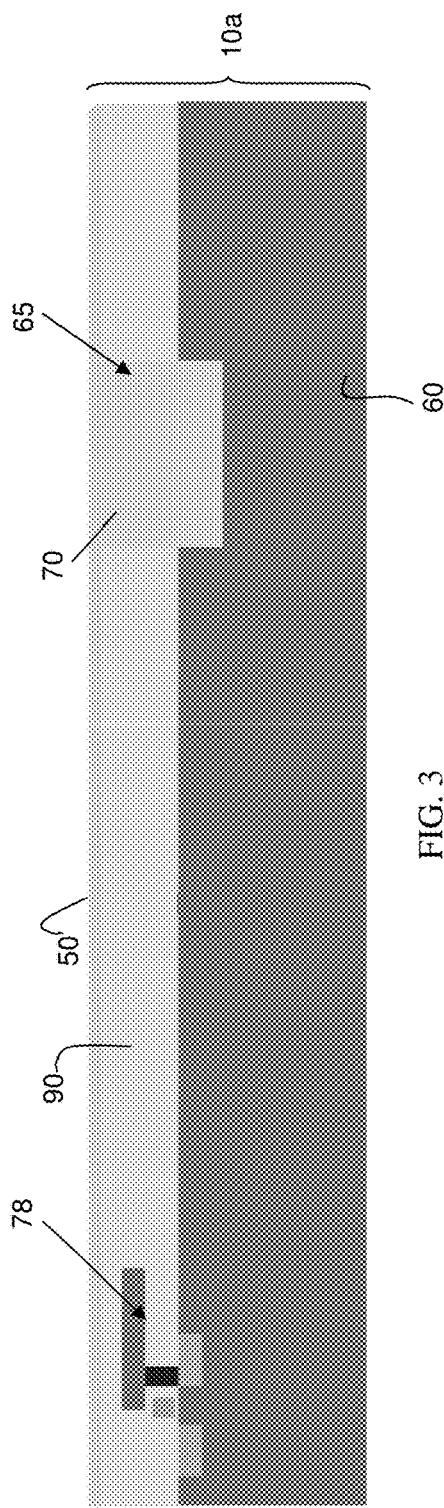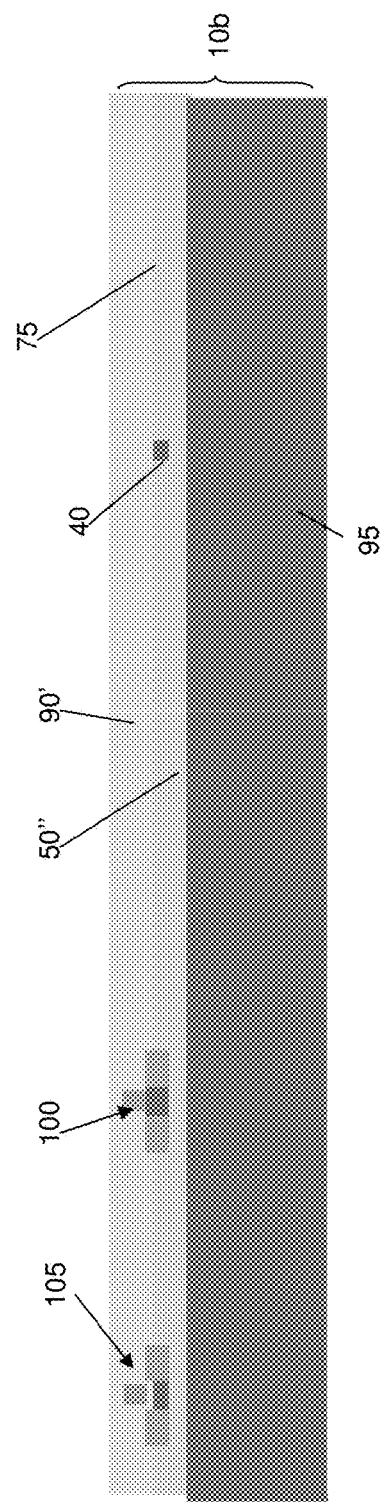
FIG. 3
FIG. 4

WAVEGUIDE STRUCTURES USED IN PHONOTICS CHIP PACKAGING

FIELD OF THE INVENTION

The present disclosure relates to semiconductor structures and, more particularly, to waveguide structures used in phonotics chip packaging and methods of manufacture.

BACKGROUND

Silicon photonics chips are being developed for high speed interconnects between dies. Waveguides can be built on silicon on insulator (SOI) wafers and can be integrated with CMOS devices. In order to make such integration, though, a connection must be made between an "off-chip" optical fiber and the waveguide structure, itself. Out-of-plane coupling uses an optical grating to couple light from the optical fiber to the waveguide structure, but this limits the optical signal to one wavelength. In-plane coupling, on the other hand, allows broadband transmission (multiple wavelengths, and therefore higher bandwidth). However, achieving high coupling efficiency with in-plane coupling is difficult.

A reason for loss for in-plane coupling is that the core of the optical fiber has a much larger diameter than the Si waveguide structure. The loss can be reduced using an inverse taper on the Si waveguide, for improved coupling. For maximum coupling, it is important to surround the Si waveguide structure with $SiO_2$ or an optical epoxy (same refractive index as $SiO_2$). If the waveguide structure is not surrounded by the appropriate optical material (e.g., $SiO_2$ or optical epoxy), some light will couple into the substrate and the signal will be reduced. Also, bonding an optical fiber to the waveguide has proven to be a difficult process. The primary detractor is a large signal loss for light transitioning from the fiber to the waveguide.

SUMMARY

In an aspect of the disclosure, a structure includes: a first die comprising photonics functions including a waveguide structure; a second die bonded to the first die and comprising CMOS logic functions; and an optical fiber optically coupled to the waveguide structure and positioned within a cavity formed in the second die.

In an aspect of the disclosure, a structure includes: a first substrate including: a plurality of CMOS devices; an etched channel to support an optical fiber; a trench which includes fill material with a refractive index suitable for optical systems; and a first dielectric layer disposed on the first substrate; and a second substrate including: a dielectric layer which is coupled to the first dielectric layer; a waveguide structure; and an undercut trench underlying the waveguide structure and filled with underfill material that has a matching refractive index as the fill material.

In an aspect of the disclosure, a method includes: a method includes: forming a first die with at least a waveguide structure formed thereon; forming a second die with CMOS functions formed thereon; and bonding the first die to the second die by an oxide-oxide bonding process.

BRIEF DESCRIPTION OF THE DRAWINGS

The present disclosure is described in the detailed description which follows, in reference to the noted plurality of drawings by way of non-limiting examples of exemplary embodiments of the present disclosure.

FIGS. 3-5 show cross-sectional views of the photonics chip and methods of fabricating the photonics chip in accordance with aspects of the present disclosure.

DETAILED DESCRIPTION

Figure 1:
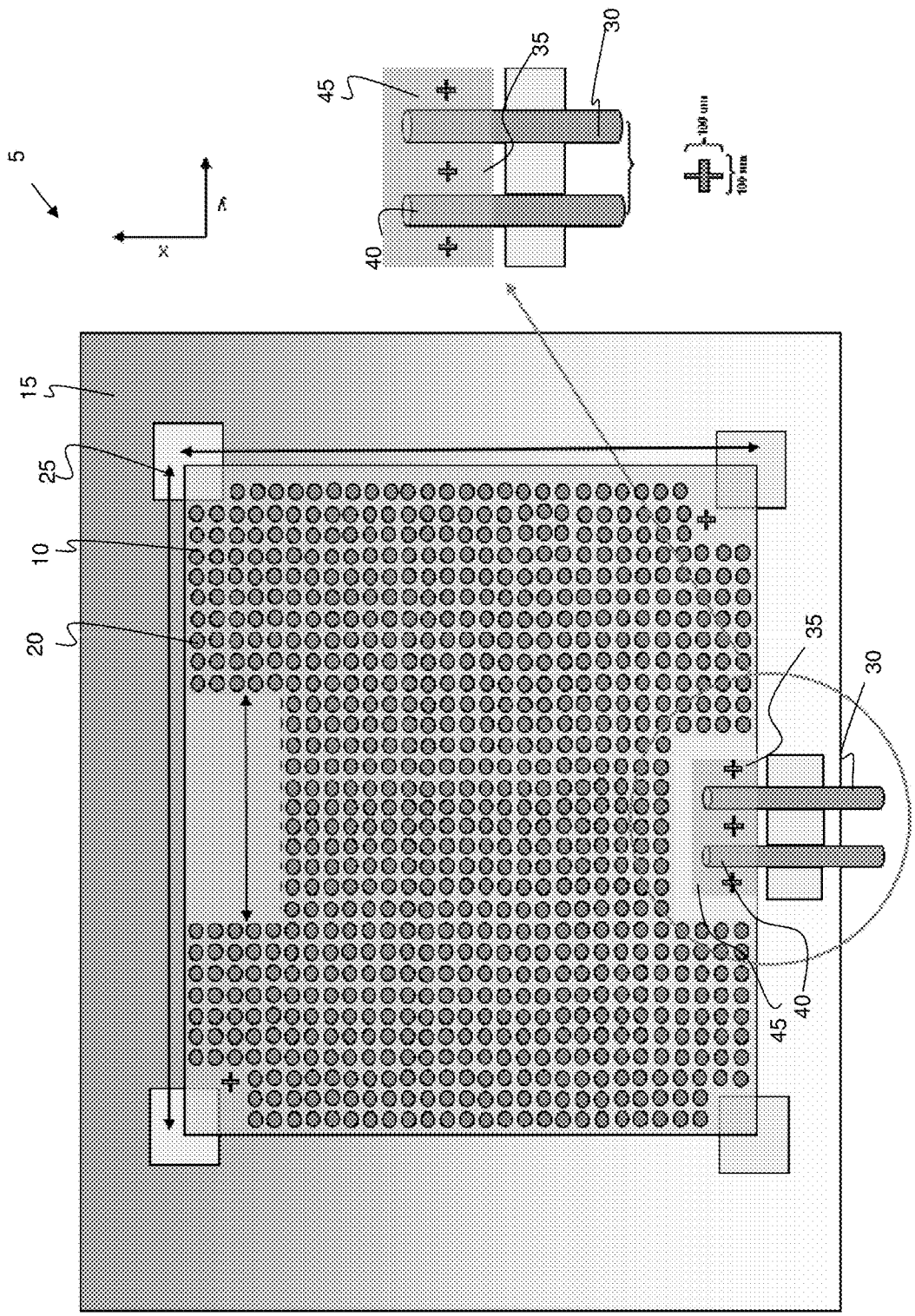
FIG. 1 shows a top view of a photonics chip positioned on an interposer with optical fibers in accordance with aspects of the present disclosure.

The present disclosure relates to semiconductor structures and, more particularly, to waveguide structures used in phonotics chip packaging and methods of manufacture. More specifically, the present disclosure is directed to a substrate with a waveguide structure bonded to a CMOS chip. For example, the package includes a three dimensional (3D) photonics chip with photonics functions (e.g., waveguide structure) on an upper die (substrate or chip) and logic functions on a lower die (substrate or chip). This configuration allows oxide (or other dielectric fill material) to be placed above and below the waveguide structure and the waveguide structure to be encapsulated in a matching dielectric with a matching, e.g., same, index of refraction. Advantageously, this configuration reduces any signal loss for light transitioning from the optical fiber to the waveguide structure.

In more specific embodiments, the structure can include a trench (e.g., $SiO_2$ trench) in a lower die underneath the waveguide (e.g., Si waveguide in the upper die) to provide appropriate refractive index matching. Alternatively, the trench (e.g., $SiO_2$ trench) can be in an upper die above the waveguide (e.g., Si waveguide in the lower die) to provide appropriate refractive index matching. Also, the other die (which does not include the Si waveguide) would include other circuitry, with the upper die and the lower die being bonded together by an oxide-oxide bonding process. The oxide-oxide bond can include an oxide layer on the lower die and a BOX layer of an upper die to provide refractive index matching around the waveguide structure (or vice versa). Also, in embodiments, a V-groove can be provided in an interposer or in Si of the lower die for "x" and "y"-alignment of the optical fiber to the waveguide structure.

In further embodiments, a first substrate (e.g., silicon substrate) includes an etched channel to support an optical fiber, with a plurality of CMOS devices formed thereon. A dielectric layer is disposed on the first substrate. A second substrate (e.g., silicon substrate) is coupled/mounted to the first dielectric layer, wherein the second substrate includes a photonic waveguide structure. A buried oxide layer and shallow trench isolation layer is deposited on the first dielectric layer and surrounds/abuts the photonic waveguide structure. In embodiments, a silicon dioxide underfill is deposited in an undercut trench underlying the photonic waveguide structure, and a second dielectric layer is disposed on a BOX layer and the photonic waveguide structure. A BSPG interposer overlays the device and can be supported by a spacer on a bottom side. The BSPG interposer can have an etched channel on the bottom side to overlay the optical fiber.

The structures described in the present disclosure can be manufactured in a number of ways using a number of different tools. In general, though, the methodologies and tools are used to form structures with dimensions in the micrometer and nanometer scale. The methodologies, i.e., technologies, employed to manufacture the structures of the present disclosure have been adopted from integrated circuit (IC) technology. For example, the structures are built on wafers and are realized in films of material patterned by photolithographic processes on the top of a wafer. In particular, the fabrication of the structures uses three basic building blocks: (i) deposition of thin films of material on a substrate, (ii) applying a patterned mask on top of the films by photolithographic imaging, and (iii) etching the films selectively to the mask.

FIG. 1 shows a top view of a photonics chip positioned on an interposer with optical fibers in accordance with aspects of the present disclosure. More specifically, the structure 5 includes a substrate 10 (e.g., photonics chip) mounted on an interposer 15 via a plurality of connections 20. In embodiments, the photonics chip 10 includes a waveguide structure 40 (and other photonics circuitry) formed on a first chip or die and surrounded by an oxide material (e.g., a material that has an index of refraction which is compatible with optical systems) and logic functions formed on a second chip or die with material having a matching, e.g., same, index of refraction as the oxide material. In this way, when the two dies are bonded together, the waveguide structure 40 will be surrounded and, even encapsulated, within material 45 that has a matching, e.g., same, index of refraction that is compatible with the optical systems described herein. See, e.g., FIGS. 2-6.

In embodiments, the plurality of connections 20 are composed of a ball grid array and more specifically a plurality of solder balls. In embodiments, the solder balls can be, e.g., controlled collapse chip connections (C4 connections). C4 connections is a process for interconnecting semiconductor devices, such as integrated circuit chips to external circuitry with solder bumps that have been deposited onto chip pads. The solder bumps are deposited on the chip pads on the top side of the wafer during the final wafer processing step. In order to mount the chip to external circuitry (e.g., a circuit board or another chip or wafer), it is flipped over so that its top side faces down, and aligned so that its pads align with matching pads on the external circuit, and then the solder is reflowed to complete the interconnect. This is in contrast to wire bonding, in which the chip is mounted upright and wires are used to interconnect the chip pads to external circuitry.

Still referring to FIG. 1, the photonics chip 10 can be mounted onto polymer spacers 25, which are positioned between the photonics chip 10 and the interposer 15. The interposer 15 can be, for example, a glass interposer composed of BSPG. One or more optical fibers 30 are optically coupled to the photonics chip 10 and more specifically to the waveguide structure 40. In embodiments, the optical fibers 30 are positioned within a cavity 35 (e.g., optical cavity) formed within the photonics chip 10, and optically coupled to the waveguide structure 40. The cavity 35 can be a V-shaped groove filled with dielectric material, e.g., $SiO_2$. It is understood by those of skill in the art that the cavity 35 can be other shapes. The remaining space between the photonics chip 10 and the interposer 15 can be filled with underfill material to provide mechanical stability to the die (photonics chip) mounted on the interposer 15. For example, the underfill material is formed in the interstitial areas between the solder balls 20.

Figure 2:
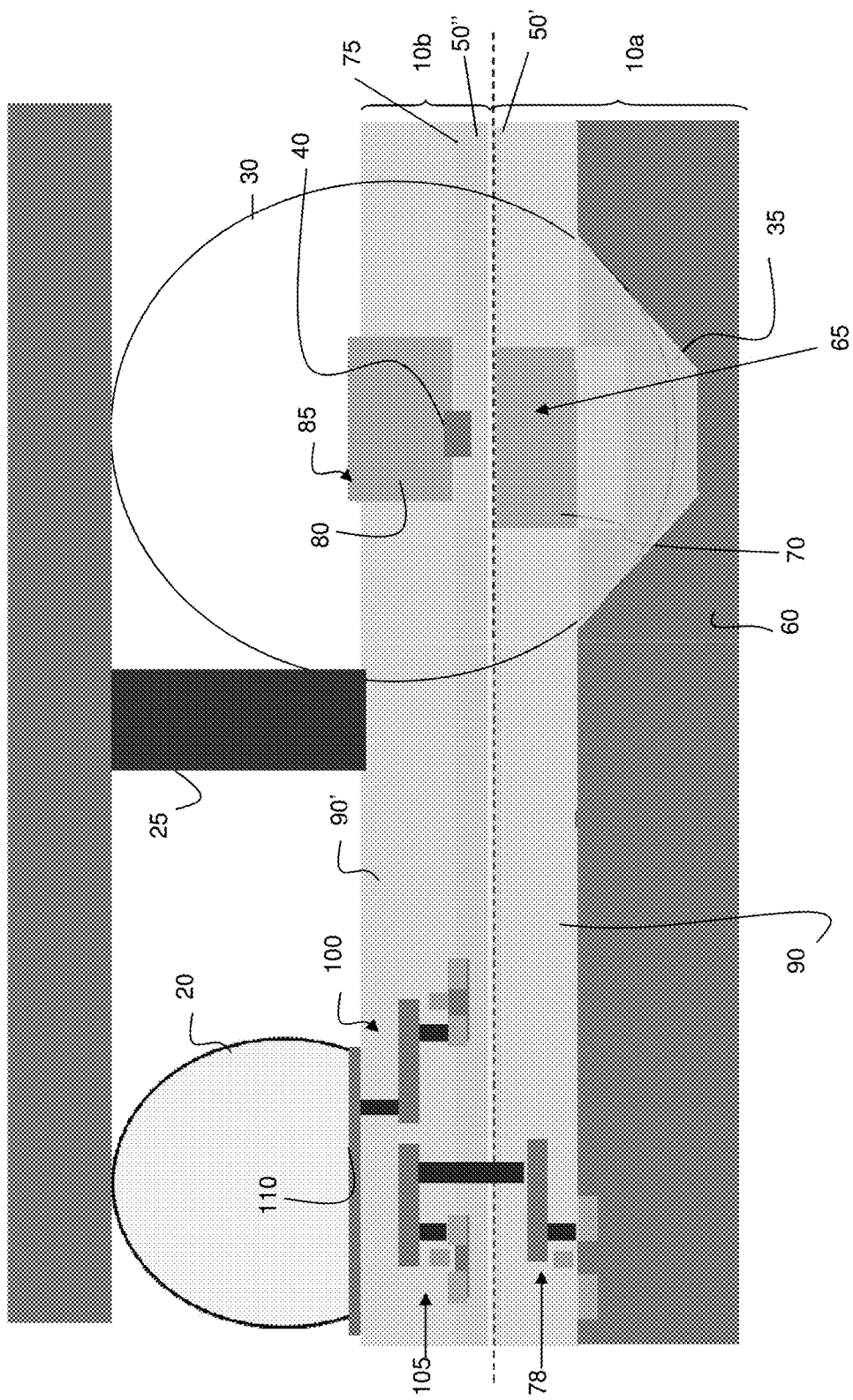
FIG. 2 shows a cross-sectional view of the photonics chip in accordance with aspects of the present disclosure.

FIG. 2 shows a cross-sectional view of the photonics chip in accordance with aspects of the present disclosure. More specifically, in FIG. 2 the photonics chip 10 includes a first chip or die 10a bonded to a second chip or die 10b. In embodiments, the first die 10a and the second die 10b are bonded together by an oxide-oxide bond, e.g., by thermally bonding oxide layers 50' and 50".

In embodiments, the chip or die 10a includes a dielectric layer 90 deposited on a wafer 60, e.g., silicon wafer. A channel 65 is formed in the dielectric layer 90 and extends into the wafer 60. The channel 65 is filled with dielectric material 70, preferably $SiO_2$ or other material that has an index of refraction that is compatible with optical systems. The chip or die 10a further includes a plurality of CMOS devices 78 formed in the dielectric layer 90. The plurality of CMOS devices 78 can be formed using conventional lithography, etching (e.g., reactive ion etching (RIE) and deposition processes. A dielectric layer 50' is disposed on the wafer 60. A cavity 35 is formed in the substrate 10a and more specifically in the wafer 60 to support the optical fiber 30. In embodiments, the cavity is a V-groove.

Still referring to FIG. 2, the second chip or die 10b includes a dielectric layer, e.g., oxide material 50". The second chip or die 10b, e.g., silicon substrate, further includes the waveguide structure 40. In embodiments, the waveguide structure 40 can be formed within an oxide layer 75 (e.g., BOX) deposited on the dielectric layer 50". In embodiments, $SiO_2$ underfill material 80 is deposited in an undercut trench 85 (formed by conventional lithography, etching and deposition methods), formed in interlevel dielectric material 90'. The underfill material 80 is underlying the waveguide structure 40. The dielectric material 80 has a matching, e.g., same, index of refraction as the underfill material 65, e.g., $SiO_2$; although other materials compatible with the optical systems are also contemplated herein. In this way, when the chips or dies 10a and 10b are bonded together the waveguide structure 40 will be surrounded and even encapsulated within material (e.g., $SiO_2$) that has a matching, e.g., same, index of refraction that is compatible with the optical systems described herein. (This encapsulated material is generally shown as reference 45 in FIG. 1.)

The second chip or die 10b further includes other photonics structures including a modulator, thermal phase heater, deflector, etc., all represented by reference numeral 100. The other photonics structures 100 are formed in interlevel dielectric material 90'. In embodiments, the photonics structures 100 can be formed using conventional deposition, lithography and etching process. In addition, a plurality of active and passive devices 105 are formed in the interlevel dielectric material 90'. A metal wiring layer or bonding pad 110 can be formed in contact with the photonics structures 100, formed using conventional deposition and patterning processes. The substrate 10b is mounted to the interposer 15, e.g., BSPG interposer, by a plurality of connections 20, e.g., solder connections, formed on the bond pad 110. A polymer spacer 25 is positioned between the photonics chip 10 and the interposer 15.

Figure 5:
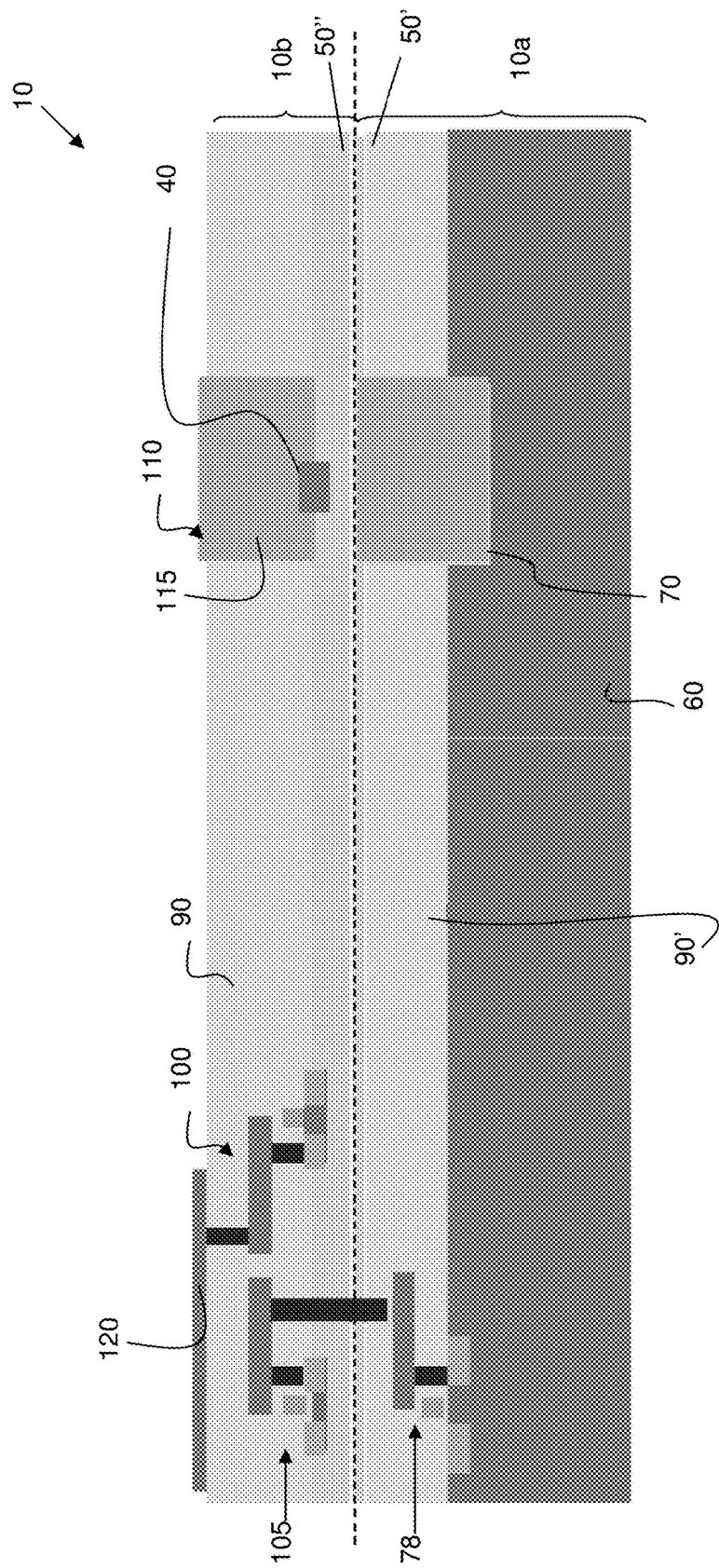

FIGS. 3-5 show cross-sectional views of the photonics chip and methods of fabricating the photonics chip in accordance with aspects of the present disclosure. More specifically, as shown in FIG. 3, the chip or die 10a includes a wafer 60, e.g., silicon substrate with an interlevel dielectric material 90. In embodiments, the interlevel dielectric material 90 can include one or more layers of interlevel dielectric material, e.g., $SiO_2$, formed using conventional deposition processes, e.g., chemical vapor deposition (CVD) processes.

In embodiments, CMOS devices 78 can be formed within or on the interlevel dielectric material 90 using conventional CMOS processes. In embodiments, the CMOS devices can be any active device (e.g., field effect transistor) or passive device (e.g., resistor, capacitor, and wiring structures). As shown in this representation, the chip or die 10a does not include any photonic devices, e.g., waveguide structures.

A trench 65 is formed within the interlevel dielectric material 90 and extends into the wafer 60. In embodiments, the trench 65 is formed using conventional lithography and etching (e.g., RIE) processes. In embodiments, the trench 65 can be about 120 μm to about 150 μm in diameter or width and about 60 μm to about 70 μm in height, and can extend into the substrate 60 by about 10 μm to about 20 μm. The trench 65 is filled with dielectric material 70, e.g., $SiO_2$, formed using conventional deposition methods, e.g., CVD processes. A planarization process can be used to planarize the surface of the interlevel dielectric material 90 and dielectric fill material 70. In embodiments, the planarization process can be a chemical mechanical polishing (CMP) process. A dielectric cap 50', e.g., $SiO_2$, can be formed on the planarized surface. In embodiments, the dielectric material 70 and dielectric cap 50' can be materials which are suitable for optical applications, which preferably have a matching, e.g., same, index of refraction as those which are formed on the chip or die 10b. In embodiments, the dielectric cap 50' is formed by a blanket deposition process, e.g., CVD.

As shown representatively in FIG. 4, the photonics chip 10b can be fabricated separately from the CMOS portion of the structure. In particular, the photonics chip 10b can include a handler wafer 95, with an oxide layer 50" and STI structures formed on the wafer 95. In embodiments, the oxide layer 50" can be a buried oxide layer (e.g., BOX) or can be an additional oxide layer formed on the BOX 75. The oxide layer 50" can be formed from material with a matching, e.g., same, index of refraction as the dielectric material 70 and dielectric cap 50', e.g., $SiO_2$. In this way, the waveguide structure 40 can be completely encapsulated within material having a matching, e.g., same, index of refraction.

The waveguide structure 40 can be formed within the oxide layer 50"/75 using conventional lithography, etching and deposition methods. For example, a trench can be formed in the oxide layer 50"/75 by depositing a resist on the oxide layer 50"/75, exposing it to light to form an opening, and performing an etching (RIE) process through the opening. Following the removal of the resist, e.g., through a conventional stripping process, silicon material, e.g., Si, SiGe, etc., can be deposited within the trench to form the waveguide structure 40. Similarly, other photonics structures 100 can also be formed in a similar manner. After formation of the waveguide structure 40, a CMP process can be performed to planarize the waveguide structure 40 and the oxide layer 50"/75. A plurality of active and passive devices 105 can also be formed on the photonics chip, e.g., within an insulator material 90', in a similar manner as described with respect to FIG. 3.

In FIG. 5, the wafer 95 of the chip or die 10b can be removed and the chips or dies 10a and 10b can be bonded together using conventional bonding processes. By way of example, the wafer 95 can be removed by a grinding process and the chips or dies 10a and 10b can be bonded together via well known oxide-oxide bonding processes using layers 50' and 50" as the bonding surfaces. For example, the oxide-oxide bonding process can be a high temperature and compression method.

Still referring to FIG. 5, a trench 85 is formed over the waveguide structure 40, exposing a portion thereof. In embodiments, the trench 85 can be formed in the interlevel dielectric material 90 using conventional lithography and etching processes, e.g., RIE. The trench 85 is then filled with dielectric material 50 that has a matching, e.g., same, index of refraction as the underfill material 65. For example, the trench 85 can be filled with $SiO_2$; although other materials compatible with the optical systems are also contemplated for use herein. In this way, the waveguide structure 40 is now encapsulated or surrounded by material with a matching, e.g., same, index of refraction. Advantageously, this material can also be used to support the waveguide structure 40. A metal wiring layer or bonding pad 120 can be formed in contact with the photonics structures 100, using conventional deposition and patterning processes.

The chip 10 can then be bonded to the interposer as shown in FIGS. 1 and 2. For example, a connection 20 is formed on the bonding pad 120. In embodiments, the connection 20 is a solder bump formed in a conventional manner. In addition, an optical fiber can be placed with the cavity 35 formed in the chip or die 10a and, more particularly, within the wafer 60. In embodiments, the cavity 35 can be a V-groove which is used to support the optical fiber in alignment with the waveguide structure 40. The cavity 35 can be formed by a wet etch such as emersion or spray etching and is sized and shaped to accommodate and support the optical fiber 30.

Figure 6:
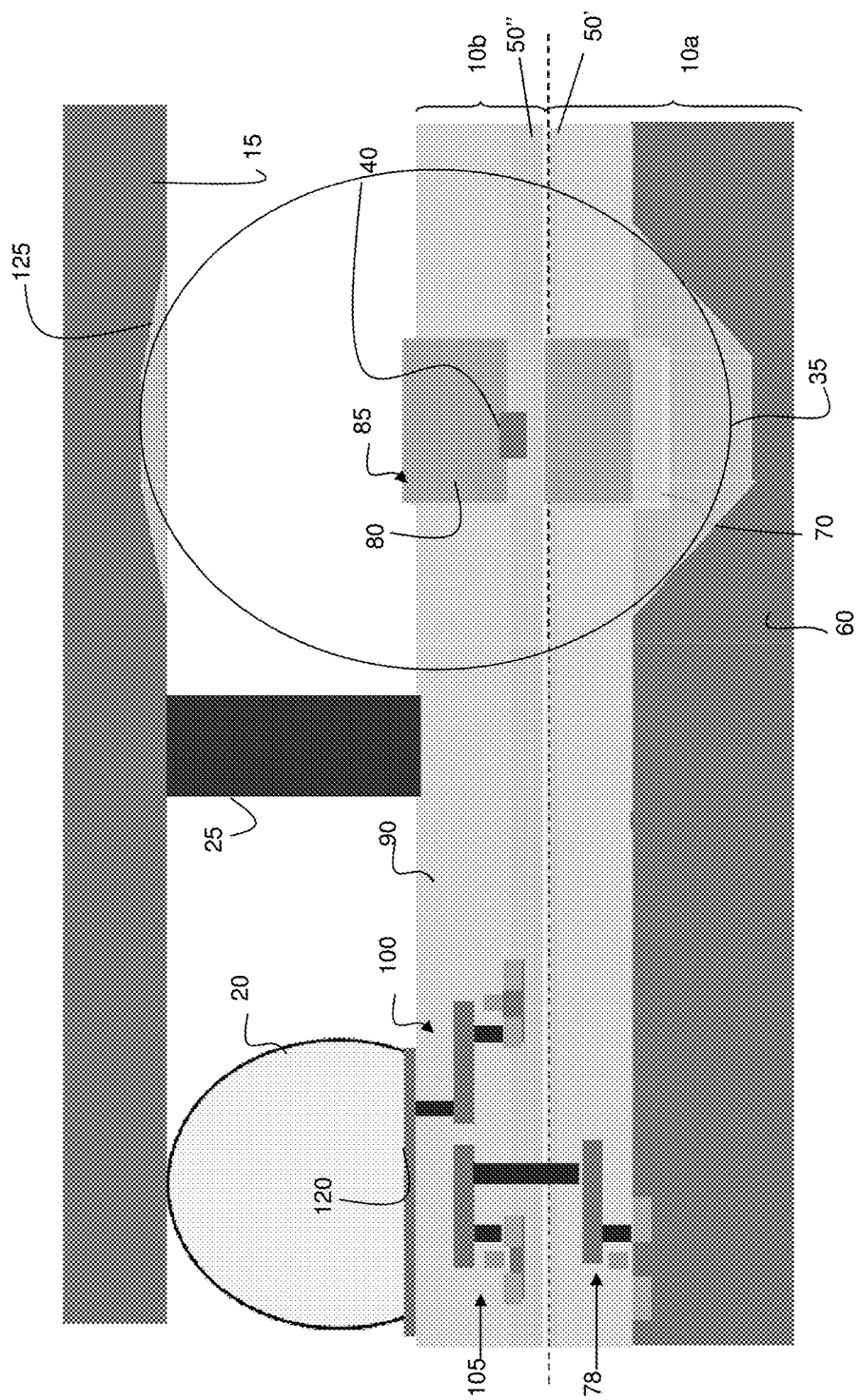
FIG. 6 shows a cross-sectional view of the photonics chip positioned on an interposer with optical fibers in accordance with additional aspects of the present disclosure.

FIG. 6 shows a cross-sectional view of the photonics chip positioned on an interposer with optical fibers in accordance with additional aspects of the present disclosure. In FIG. 6, a groove or notch 125 is formed in the interposer 15. In embodiments, the groove or cavity 125 will provide further support for the optical fiber 30. The groove or cavity 125 can be formed by a etching process, e.g., wet etching process. In embodiments, the groove or cavity 125 can be sized and shaped to accommodate and support the optical fiber 30 in the assembled state.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
   a first die comprising photonics functions including a waveguide structure;
   a second die bonded to the first die and comprising CMOS logic functions; and
   an optical fiber optically coupled to the waveguide structure and positioned within a cavity formed in the second die.

2. The structure of claim 1, wherein the bond between the first die and the second die is an oxide-oxide bond.

3. The structure of claim 2, wherein the oxide-oxide bond comprises a BOX layer on an upper surface of the first die and a dielectric layer on an upper surface of the second die.

4. The structure of claim 2, wherein the waveguide structure is surrounded by material that has a matching refractive index.

5. The structure of claim 4, wherein the material that has the matching refractive index is $SiO_2$.

6. The structure of claim 5, wherein the $SiO_2$ fills a trench underneath the waveguide structure on the first die and a trench in the second die.

7. The structure of claim 1, wherein the cavity is a V-groove in Si of second die.

8. The structure of claim 1, further comprising an interposer connected to the second die.

9. The structure of claim 8, wherein the interposer is BSPG.

10. The structure of claim 8, wherein the interposer is connected to the second die by solder connection.

11. The structure of claim 8, further comprising a polymer spacer on the interposer for z-alignment of the optical fiber to waveguide structure.

12. The structure of claim 8, wherein the interposer includes a notch which is structured to accommodate the optical fiber.

13. A structure, comprising:
   a first substrate comprising:
      a plurality of CMOS devices;
      an etched channel to support an optical fiber;
      a trench which includes fill material with a refractive index suitable for optical systems; and
      a first dielectric layer disposed on the first substrate; and
   a second substrate comprising:
      a dielectric layer which is coupled to the first dielectric layer;
      a waveguide structure; and
      an undercut trench underlying the waveguide structure and filled with underfill material that has a matching refractive index as the fill material.

14. The structure of claim 13, wherein the fill material and the underfill material is $SiO_2$.

15. The structure of claim 13, wherein the waveguide structure is surrounded by the fill material and the underfill material.

16. The structure of claim 13, wherein the first substrate is devoid of photonics functions.

17. The structure of claim 13, further comprising an interposer connected to the second substrate and overlays the waveguide structure is and supported by a spacer on a bottom side.

18. The structure of claim 17, wherein the interposer comprises an etched channel to support the optical fiber.

19. The structure of claim 1, wherein the cavity of the second die is an etched channel to support the optical fiber and the second die further comprises a first dielectric layer disposed on the second die and a trench which includes fill material with a refractive index suitable for optical systems.

20. The structure of claim 19, wherein the first die includes a dielectric layer which is coupled to the first dielectric layer and the first die further comprises an undercut trench underlying a waveguide structure and filled with underfill material that has a matching refractive index as the fill material.

* * * * *